April 29, 1969     P. C. TABOR     3,441,303
CLOSURE LATCH
Filed June 28, 1967
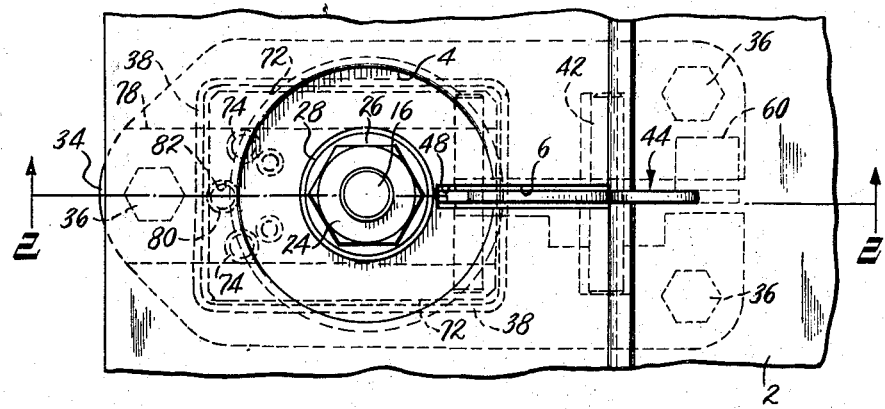
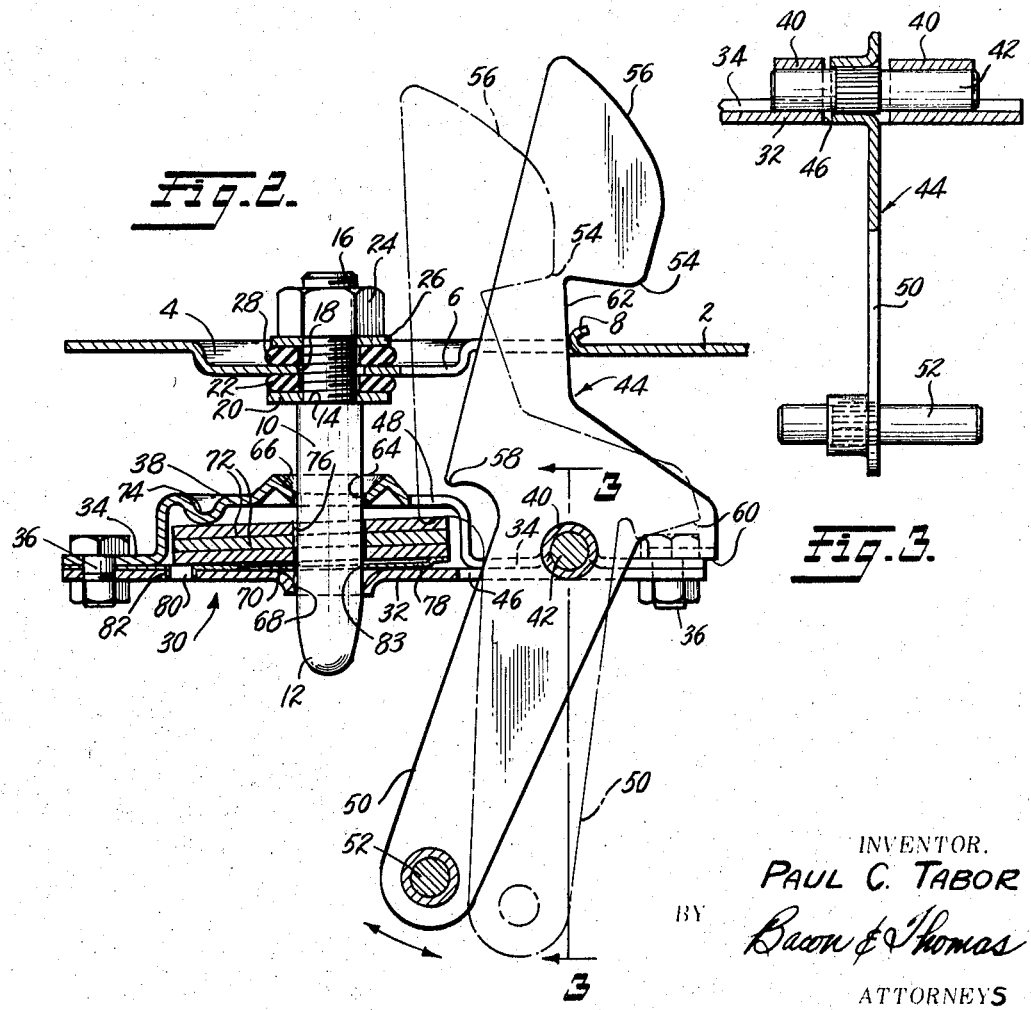
INVENTOR.
PAUL C. TABOR
BY Bacon & Thomas
ATTORNEYS 3,441,303
CLOSURE LATCH
Paul C. Tabor, Clawson, Mich., assignor to Meteor Research Limited (as nominee of Mercury Metalcraft Company), Roseville, Mich., a partnership
Filed June 28, 1967, Ser. No. 649,608
Int. Cl. E05c 17/38, 3/14, 17/50
U.S. Cl. 292—306               6 Claims

ABSTRACT OF THE DISCLOSURE

An enclosing housing containing a stack of loose plates having aligned openings therethrough aligned with pilot or guide means on both sides of the stack, spring means and an offset abutment urge the plates to tilt to grip a hardened latch pin guided through the housing by the pilot means and held thereby against tilting. The latch pin is resiliently mounted on a movable closure means.

BACKGROUND OF THE INVENTION

The present invention is in the field of closure latching means employing a pin on one member and a stack of tiltable apertured plates on the other to wedgingly grip the pin and hold the closure in closed position.

The description herein is directed specifically to a hood latch for an automobile but the principles of the invention are applicable to closure latching means in general. A tiltable plate engageable with a pin on an automobile hood is known for the purpose of holding the hood in closed position. See for example the patent to Krause 2,789,848. However, such prior devices have been deficient in certain respects and have not proven practical.

SUMMARY OF THE INVENTION

Applicant has discovered that a tilting plate clamping means for a latch pin can be made reliable and efficient by providing a plurality of plates with aligned openings and means for accurately guiding the latch pin through those openings and holding it in properly oriented position. The openings through the plates accurately conform to the outline of the pin so that only a slight tilting of the plates causes their opposed edges to jam or bind against the sides of the pin and securely lock the same against withdrawal. Spring means bear against one side of the stack of plates to cause the tilting and the latch pin is resiliently mounted on its support so that it will accurately enter the guiding means even though the closure member may be somewhat out of alignment. A further feature of the invention resides in initially upsetting or deforming the openings in the plates to a slight degree so that they accurately conform to the outline of the latch pin, thus providing a substantial amount of surface contact and reducing the unit pressures involved. The latch pin is preferably of hardened steel so that the surface thereof does not become deformed as a result of continued and prolonged use.

BRIEF DESCRIPTION OF THE DRAWINGS

FIG. 1 is a plan view of a closure latch embodying the present invention;
FIG. 2 is a vertical sectional view taken along the line 2—2 of FIG. 1; and
FIG. 3 is a vertical sectional view taken along the line 3—3 of FIG. 2.

DESCRIPTION OF THE PREFERRED EMBODIMENT

As previously stated, the following description relates to an embodiment of the invention adapted particularly for latching automobile hoods in closed position, although it is to be understood that the principles of the invention may be employed in latching means for any type of closure, such as automobile trunk lids, doors, or other closures in other environments.

Referring particularly to FIG. 2, numeral 2 indicates a strut or structural beam or plate normally found secured to the under side of an automobile hood but spaced from the outer shell thereof. The strut 2 is in the form of a flat plate and is provided with a depression 4 therein defining a well. A slot 6 is cut into the plate 2 and extends into a portion of the well 4 while a portion of the material removed when forming slot 6 is reversely bent, as at 8, to define a rounded edge at one end of the slot 6. A latch pin 10 of hardened steel rod is provided with a rounded or tapered end 12 and a shoulder 14. From the shoulder 14 a reduced diameter threaded portion 16 extends upwardly through a central opening 18 in the bottom of the well 4. A washer 20 bears against shoulder 14 and is held in spaced relation to the lower surface of the bottom of the well 4 by a resilient washer 22 of rubber or like material. A nut 24 is threaded onto the upper end of portion 16 and bears on a washer 26, which in turn is held spaced from the upper surface of the bottom of well 4 by a second resilient washer 28, also of rubber or the like. It is to be noted that the opening 18 is somewhat larger than the diameter of the threaded portion 16 and by tightening the nut 24 a suitable amount, the latch pin 10 can be held in the central position, relative to the opening 18, shown in the drawings, but the pin is obviously tiltable about a lateral axis and is also laterally movable a slight amount, such tilting and lateral movement being permitted by the resilient washers 22 and 28.

A frame member designated generally by numeral 30 comprises a bottom plate 32 and an upper plate 34 secured together by bolts 36 or the like. The frame member is intended to be securely fastened to a portion of an automobile frame at the front thereof and usually forwardly of and above the customary radiator and in a position in line with the latch pin 10 when the hood is closed. The upper plate 34 is formed to define a dome-like portion 38 defining a housing with the lower plate 32. The upper plate 34 is also provided with upwardly struck loop portions 40 (see FIG. 3 also), which with lower plate 32 define aligned bearings for a pivot pin 42. Secured to the pivot pin 42 between the loops 40 is a latch lever generally designated by numeral 44. The latch lever 44 extends through aligned slots 46 and 48 in the plates 32 and 34, respectively, and is provided with a depending leg 50 having a transverse handle pin 52 secured in its lower end. The latch lever 44 also extends upwardly through a slot 6 in strut 2, when the hood is closed, and is provided with a hooked upper end portion 54 formed to define a bevel or cam surface 56 at its uppermost edge. A portion of the latch lever 44 near housing 38 is formed to define an abutment 58 adapted to enter the interior of housing 38, through slot 48, when the latch lever 44 is swung counterclockwise, as seen in FIG. 2. Further reference will be made to the abutment 58. While not shown in the drawings, a suitable spring is provided to urge the latch lever 44 to rotate clockwise, as seen in FIG. 2, and a shoulder 60 formed on a portion of the lever 44 can be brought into abutment with the upper plate 34 to limit clockwise rotation of the lever. Preferably, the neck portion 62 of lever 44 abuts rounded edge 8 of strut 2 slightly prior to engagement of the shoulder 60 with the plate 34 when the parts are in the relative positions shown.

The portion of upper plate 34 defining the housing 38 is further formed to define a pilot opening 64 and a generally annular downwardly converging guide surface 66. In like manner, the lower plate 32 is formed with an opening 68 therethrough, in alignment with the opening 64 and bounded by a downwardly tapering guide surface 70. A stack of plates 72, there being three shown, is positioned in the housing 38, the plates being separate and freely movable within the housing in all lateral directions, throughout a limited extent. The housing portion 38 is further formed with a pair of depending dimples 74 on one side of openings 64 and 68 and which dimples bear on the upper surface of the upper plate 72, that is the plate nearest the closure member 2 and serving as a fulcrum about which the plates can tilt. Each plate 72 is provided with an opening 76 therethrough of substantially the same diameter as the latch pin 10.

A flat leaf spring 78 underlies the plates 72 and bears against the lowermost plate 72 adjacent its outer edge and on the side opposite openings 76 from that side of the upper plate that bears against dimples 74. The flat leaf spring 78 is fixedly secured in the bottom of the housing 38 by being clamped between the plates 32 and 34 at one end and is so provided with downwardly struck portions 80 engaging in openings 82 in the bottom plate 32 to hold the spring 78 properly oriented during assembly. An opening 83 in spring 78 permits pin 10 to pass freely therethrough. The spring 78 is biased to exert a constant upward pressure at the outer edge of the stack of plates 72 continuing to cause the plates to tilt about the fulcrum provided by dimples 74.

As is well known, the described tilting of the plate 70 will cause the openings 76 thereof to bind against the sides of the pin 10 and any tendency for the pin 10 to rise upwardly will be resisted by that frictional binding action and actually cause increased pressure between the sides of the opening 76 and the latch pin to thus resist such upward movement of the pin.

In making the plates 72, the openings 76 are formed quite accurately to the same size and shape as the pin 10, being just large enough for the pin to freely enter those openings. Before the device is assembled, however, a hardened mandrel of the same size and shape as pin 10 in inserted through the aligned opening 76 of the plates and is forcibly tilted about an axis parallel to the planes of those plates while the plates are held against tilting movement. This results in upsetting or deforming at least opposite edge portions of the opening 76 so that the mandrel then bears against those edges throughout substantial circumferential areas. When the plates are assembled in the housing 38, tilting thereof relative to the pin 10, under the influence of spring 78, will ensure that the edges of the opening 76 engage the pin 10 throughout a substantial area thereof and in intimate accurate contact therewith to thus develop very high frictional forces without denting or deforming the surface of the pin 10 and without requiring movement of the plates through more than an extremely small angle.

The normal position of the parts with the hood closed is shown in full lines in FIG. 2. The plates 72 are tilted and securely grip the pin 10, thus preventing upward movement of the hood of the automobile and the strut or closure member 2. When it is desired to open the automobile hood, the handle pin 52 is grasped and moved to the right, as seen in FIG. 2, thus swinging the latch lever 44 toward the dotted line position. The abutment 58 will engage the uppermost plate 72 and tilt the stack of plates a slight amount downwardly about the fulcrum 74 and thus release the plates from their gripping relation to latch pin 10. This, of course, occurs before the hook portion 54 has cleared the rounded edge 8. When the plates are tilted to release the latch pin 10, the hood can be freely lifted or opened until the rounded edge 8 engages the hook portion 54. Most automobile hoods are spring biased toward an open position and the hook 54 thus provides a second or safety latch to prevent uncontrolled opening of the hood and further provides a safety latch in the event failure should occur in the tilting plate locking portion while an automobile is moving on a highway. To completely release the latch it is only necessary to then move the handle 52 farther to the right to swing latch 44 to its dotted line position in which the hood can be completely opened.

Customarily, an automobile hood structure bears against rubber or the like bumpers on the automobile frame when in its closed position. It is also customary to provide for adjustment of those bumpers and for adjustment of the hinge axis of the hood so that the hood panel can be properly aligned with other portions of an automobile body. By mounting the latch pin 10 on the strut 2 for limited tilting and lateral movement thereon, it is possible to adjust the hood panel for proper alignment even though such adjustment may move the latch pin 10 out of precise alignment with the guide openings 64 and 68. When the hood is then closed, the rubber washers 22 and 28 permit the pin 10 to resiliently align itself with the openings 66 and 68 and enter the housing 38 in the manner intended. The openings 64 and 68 quite closely conform to the size and shape of the pin 10 so that when the pin is in the position shown in the drawings, it is held accurately centered in the housing 38 with its axis properly oriented in the required vertical direction so that the same small tilting movement of the plates 72 will effect the locking already described.

In the event the automobile hood is closed only sufficiently to permit the hook 54 to engage over rounded edge 8 but without extending the latch pin 10 to a fully closed position, the plates 72 will still function to grip the pin 10 and any subsequent vibration, bouncing, jolts, or similar forces applied to the vehicle will cause the pin 10 to move incrementally to move downwardly and permit the plates 72 to take a new grip thereon, thus drawing the hood downwardly into firm engagement with the rubber bumpers previously referred to. Obviously, the pin 10 cannot pull upwardly out of the opening 76 but can move freely downwardly therein.

When closing an open hood, the rounded edge 8 engages cam edge 56 to swing lever 44 counterclockwise so that hook portion 54 can enter slot 6.

The plates 72 are preferably of softer metal than pin 10 to avoid denting or deforming the latter and insure intimate frictional surface contact therewith. Since surface friction provides the holding force, the total force of which the latch is capable can be predesigned by employing the proper number of plates 72. Since plates 72 are free floating in housing 38, each can properly align itself with pin 10 so that each carries its full share of the load.

While a single specific embodiment of the invention has been shown and described herein, the same is merely illustrative of the principles involved, other embodiments being contemplated within the scope of the appended claims.

I claim:

1. A closure latch comprising: a fixed frame member; a closure means movable toward and from said frame member and including a movably mounted latch pin extending toward said frame member and being yieldably tiltable and laterally movable in relation thereto; a housing on said frame member; a stack of a plurality of plates loose in said housing for limited universal lateral movement therein, said plates having aligned openings therethrough of a size and shape substantially the same as the cross sectional size and shape of said latch pin; spring means bearing on the plate remote from said closure means on one side of said openings and urging that side of said plates toward said closure means; a fulcrum abutment bearing on the plate nearest said closure means, on the other side of said openings whereby said spring means urge said plates to tilt about said abutment and thereby frictionally grip the sides of said pin; and guide means for guiding said pin through said openings upon movement of said closure means toward said frame member and for holding said pin against tilting relative to said housing.

2. A closure latch as defined in claim 1 wherein said guide means comprise pilot openings in said housing and aligned with the openings in said plates, to engage and guide said latch pin and restrain tilting thereof relative to said housing.

3. A closure latch as defined in claim 1 wherein said latch pin is a solid substantially cylindrical rod of hardened metal harder than said plates.

4. A closure latch as defined in claim 1 wherein said spring means comprises a leaf spring member having a portion bearing against the bottom face of said plate remote from said closure means, and an opening through said spring member aligned with the openings in said plates and of such size that said latch pin may pass freely therethrough.

5. A closure latch as defined in claim 1 wherein the edges of said openings through said plates, at least on said one and other sides of said pin, are at least partially upset to provide snug and substantial surface contact with the sides of said latch pin when said plates are tilted into locking engagement with said pin.

6. A closure latch as defined in claim 1 including manually operable means for applying pressure to the plate nearest said closure means, on said one side of said openings, in opposition to the force of said spring means.

References Cited

UNITED STATES PATENTS

| | | | |
|---|---|---|---|
| 671,147 | 4/1901 | Robbins | 292—306 |
| 2,478,304 | 8/1949 | Mulsow | 292—306 X |
| 2,789,848 | 4/1957 | Krause | 292—306 X |

MARVIN A. CHAMPION, *Primary Examiner.*

J. R. MOSES, *Assistant Examiner.*